G. Murray,
Stop Cock.
N° 72,529.    Patented Dec. 24, 1867.
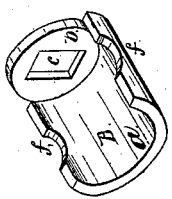
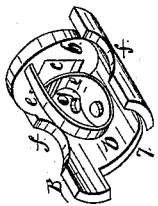
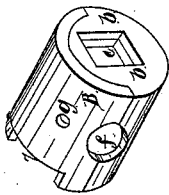
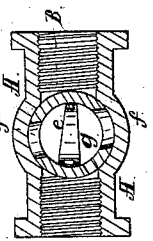
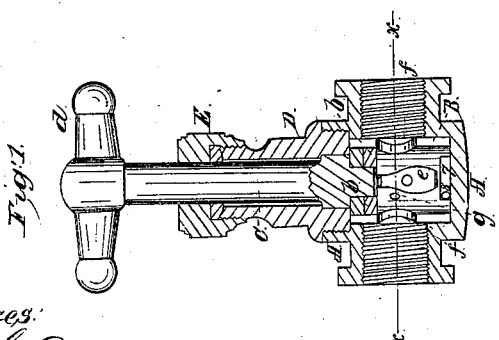
Witnesses:
Inventor:
George Murray

UNITED STATES PATENT OFFICE.

GEORGE MURRAY, OF CAMBRIDGEPORT, MASSACHUSETTS, ASSIGNOR TO HIMSELF AND JOHN C. CHAPMAN, OF SAME PLACE.

Letters Patent No. 72,529, dated December 24, 1867.

IMPROVEMENT IN VALVES FOR STEAM AND OTHER ENGINERY.

*The Schedule referred to in these Letters Patent and making part of the same.*

TO ALL WHOM IT MAY CONCERN:

Be it known that I, GEORGE MURRAY, of Cambridgeport, in the county of Middlesex, and State of Massachusetts, have invented certain Improvements in Valves or Stop-Cocks, of which the following is a full, clear, and exact description, reference being had to the accompanying drawings, making part of this specification, in which—

Figure 1 is a longitudinal section through the centre of my improved valve.

Figure 2 is a transverse section through the same on the line $xx$ of fig. 1.

Figure 3 is a perspective view of the hollow plug.

Figures 4 and 5 are perspective views of the two halves or portions of the hollow plug detached.

The ordinary globe-valve is objectionable, as the steam or water, instead of passing directly through it in a straight line, is obliged to take an indirect or angular course, which deprives it of much of its power, and also tends to wear the seat of the valve, while several revolutions of the stem or spindle are required to fully open or close the passage. The solid tapering plug-cock, although it is free from the above-mentioned difficulties, and affords a direct passage for the steam or water, is nevertheless objectionable, as it soon wears loose, causing it to leak, which necessitates regrinding.

My invention has for its object to overcome all these difficulties, and combine the advantages of both the globe-valve and cock, above referred to, and consists in a valve or stop-cock having a hollow plug made in two or more parts, and provided with a direct passage through it, an additional opening being made through the plug, so that when the latter is turned to close the passage through the valve, the opening will be brought into such a position that the steam or water will pass into the interior of the plug and expand it so that it will press tightly against its seat, and thus insure a tight joint.

To enable others skilled in the art to understand and use my invention, I will proceed to describe the manner in which I have carried it out.

In the said drawings, A is the body or shell of the valve, in which is fitted a hollow cylindrical plug, B, (fig. 3,) which is made in two parts, $ab$, of the form seen in figs. 4 and 5, the heads, 6, fitting over each other and having a rectangular opening, $c$, made through them, into which fits the extremity of the stem or spindle C, which passes through the portion D of the valve and a stuffing-box, E, beyond which it is provided with a handle, $d$, by means of which the plug is turned as required to open or close the valve. $e$ is a spring, which is secured to the portion $b$, and serves to expand the plug B, causing it to fit tightly into its seat. The plug B is provided with large openings, $f$, so that when in the position seen in fig. 1, the steam or water will pass directly through it in a straight line, in the same manner as through an ordinary plug-cock, but when the plug B is turned so as to close the valve, as seen in fig. 2, a small opening, $g$, on one side of the plug, will be brought into such a position that the steam or water will pass through into the interior of the plug and expand it tightly against its seat, so as to insure a tight joint. By thus expanding the plug B within the body A, it is kept perfectly tight as it wears, which effectually prevents leakage and avoids the necessity of regrinding. All dirt or grit is also effectually excluded from between the plug and its seat, thus lessening the wear on the parts. The portion $b$ of the plug B is cut away at 7, for the reception of a pin, 8, projecting from the shell A, thus forming a stop to prevent the plug from being turned too far in either direction. I prefer to use the spring $e$ within the hollow plug B, as it serves to hold the parts tightly in place when the valve is not in use, but it can be dispensed with, if desired. As the plug B is capable of being expanded, it can be made of the same diameter throughout its entire length, so as to insure equal wear, which cannot be effected where the plug is of a tapering form.

It will be seen that a valve, constructed as above described, possesses the advantage of a direct passage for the steam or water, together with the advantage of keeping itself tight as it wears, which is not the case with any other valve heretofore constructed with which I am acquainted.

Claim.

What I claim as my invention, and desire to secure by Letters Patent, is—

The hollow expansion-plug B, made in two or more parts, with the spring $e$, and provided with a direct passage, $f$, and an additional opening, $g$, for the entrance of the steam or water when the valve is closed, substantially as and for the purpose described.

GEORGE MURRAY.

Witnesses:
P. E. TESCHEMACHER,
N. W. STEARNS.